United States Patent [19]

Kitaue

[11] Patent Number: 4,795,902
[45] Date of Patent: Jan. 3, 1989

[54] OPTICAL MASTER CONTROLLER HAVING PLURAL TRACKS EACH WITH PLURAL EMITTER DETECTOR PAIRS

[75] Inventor: Masaaki Kitaue, Kobe, Japan
[73] Assignee: Nippon Air Brake Co., Ltd., Kobe, Japan
[21] Appl. No.: 121,366
[22] Filed: Nov. 16, 1987
[30] Foreign Application Priority Data
Nov. 21, 1986 [JP] Japan ................ 61-180307[U]
[51] Int. Cl.$^4$ ............................................ G01D 5/34
[52] U.S. Cl. ............................ 250/231 SE; 250/229
[58] Field of Search .......... 250/231 SE, 229, 208, 250/237 G; 340/347 P; 33/125 C; 356/395

[56] References Cited

U.S. PATENT DOCUMENTS

| | | | |
|---|---|---|---|
| 3,612,882 | 10/1971 | Sheppard | 250/208 |
| 4,429,219 | 1/1984 | Yochum et al. | 250/229 |
| 4,594,675 | 6/1986 | Yoshizawa | 250/231 SE |
| 4,686,362 | 8/1987 | Merlo | 340/347 P |
| 4,723,075 | 2/1988 | German | 250/231 SE |

Primary Examiner—David C. Nelms
Assistant Examiner—William L. Oen
Attorney, Agent, or Firm—G. J. Falce

[57] ABSTRACT

An optical controller device employing a single rotatable light blocking plate on opposite sides of which are mounted light emitting and light receiving elements. A pattern of openings or transparent areas arcuately arranged on different circumferences of the light blocking plate determine the passage or interruption of light and thus provide output signals according to the position of rotation of an operator's handle connected to the light blocking plate. The light emitting and receiving elements are mounted on support plates configured so that a first group of the light emitting and receiving elements and a second group of the light emitting and receiving elements are symmetrically disposed on opposite sides of a centerline of the light blocking plate.

9 Claims, 2 Drawing Sheets

OPTICAL MASTER CONTROLLER HAVING PLURAL TRACKS EACH WITH PLURAL EMITTER DETECTOR PAIRS

BACKGROUND OF THE INVENTION

1. (Field of the Invention)

This invention relates to an optical brake controller or master controller located at the operator's control position in a railway car, which is used to output brake commands or force commands as an electric signal, depending on the step position of the operator's control handle. In particular, the invention relates to a system which uses a transmission type optical switch consisting of a light emitting element and a light receiving element.

2. (Prior Art)

Utility Model Kodai No. 57-58906, illustrated in FIGS. 4 to 7, is one example of the prior art for a brake or master controller using an optical type transmission switch. FIG. 4 is a schematic side view of the main portion of the brake controller or the master controller. FIG. 5 is a schematic diagram of the cross section along line c—c of FIG. 4. FIG. 6 is a schematic diagram of the cross section along line d—d in FIG. 4. FIG. 7 is a schematic diagram of the cross section along line e—e in FIG. 4.

In FIG. 4–FIG. 7, 1 is the rotating shaft, 41, 42, 43 are light blocking plates, 51a, 52a, 53a re light emitting elements and 51b, 52b, 53b are light receiving elements. There is a rotating shaft 1 inside the main body (not indicated in the FIG.) which can rotate freely, and is connected to a handle (not indicated in the FIG.) operated by the driver. The light blocking plates 41, 42, 43 are fixed on the circumference of the above-mentioned rotating shaft 1 essentially perpendicular to the center in the axial direction of the rotating sahft 1 and they have transmitting areas 41a, 41b, 42a, 43a which are formed by notching the outer rims in the circumferential direction. The light emitting element 51a and the light receiving element 51b are placed on opposite sides of the light blocking plate 41 in the axial direction (vertical direction in FIG. 4) of the rotating shaft 1 to sandwich the light blocking plate 41. In the same manner, there are elements 52a and 52b for the light blocking plate 42 and elements 53a and 53b for the light blocking plate 43.

As shown by the arrows in FIG. 5–FIG. 7, when the light blocking plates 41, 42, 43 rotate clockwise in the figure, initially, in the first step position, the transmitting area 41a shifts to the area between the light emitting element 51a and the light receiving element 51b, so that the light receiving element 51b receives the beam from the light emitting element through the transmitting area 41a and converts it into an electrical signal and this signal becomes the brake command or the force command.

When it rotates clockwise further and reaches the second step position, the transmitting area 42a, shifts to the area between the light emitting element 52a and the light receiving element 52b and in the same manner as described above, the light receiving element 52b receives the light and converts it to an electrical signal. After this, as above, the brake command or the force command is output as an electric signal. (The problem that the invention tries to solve)

However, since it is the outer rim of the light blocking plate 41, 42, 43 which forms the transmitting area 41a, 41b, 42a, 43a, in the controller of the prior art, which uses the optical type transmission switch, the position of the optical switch for these transmission areas is also on both sides of the outer rim of the light blocking plate 41–43, and also the rotation angle of the light blocking plate is limited to approximately 100°–150°. Because the many step positions must be determined inside the angle, so that there are 3 or 2 optical switches located on the outer rim of one light blocking plate, it is impossible to obtain more than this number of outputs. In addition, to obtain a larger number of outputs, the number of combinations of the light blocking plate and the optical switches must be increased, as shown in FIG. 4, which increases the overall size of the unit. In other words, the example of the prior art described above cannot supply many outputs on a small scale, which represents a problem.

(THE METHOD OF SOLVING THE PROBLEM)

Therefore, the object of this invention is to eliminate the problems described above, with regard to the fact that the inner side of the light blocking plate can also be used, and its technical method is based on the fact that the optical transmitting areas of the light blocking plate are formed on several circumferences with different radii and whose centers are concetric in the axial direction, and there is also a sensor unit which supports the above-mentioned light emitting elements and the light receiving elements, and this sensor unit is the shape of a "]", in which the above-mentioned light blocking plate is sandwiched by two support plates, and these support plates are identical and symmetrical about a specific center line which is essentially perpendicular to the axial centerline about which the light blocking plate is rotatable. One group of light emitting elements, the number of which is equal to the number of circumferences with different radii, is located on one side of the right or the left of the front part of the support plates in the direction of this specific center line; and another group of light receiving elements, the number of which is the same as the number of light emitting elements, is located on the other side of the above-mentioned right or left, and the arrangement of these light emitting elements and the light receiving elements is symmetrical to the above-mentioned specific center line, in a brake controller or the main controller which uses an optical type transmission switch.

BRIEF DESCRIPTION OF THE DRAWINGS

The following is an explanation of one embodiment of this invention with reference to the accompanying figures numbered 1 to 3.

DESCRIPTION AND OPERATION

Figure 1:
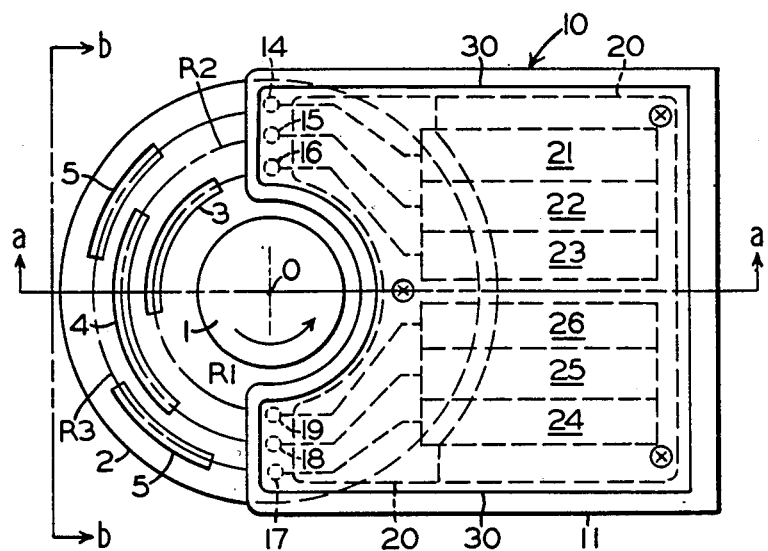
FIG. 1 is a plan view.
Figure 2:
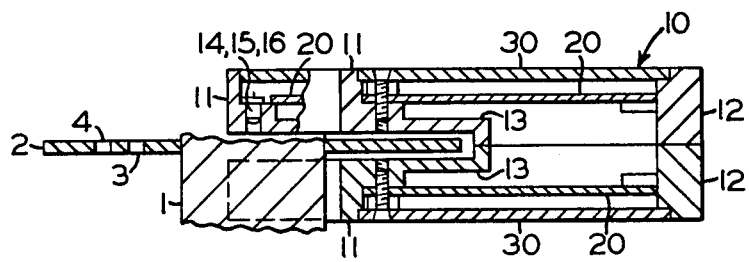
FIG. 2 is the cross-section along line a—a in FIG. 1.
Figure 3:
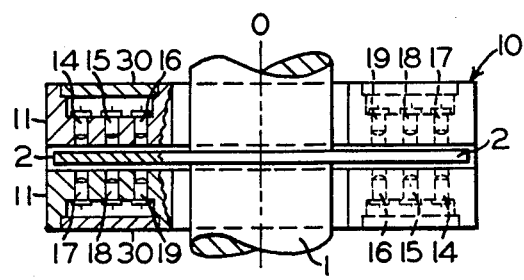
FIG. 3 is a cross-section along line b—b in FIG. 1.
Figure 4:
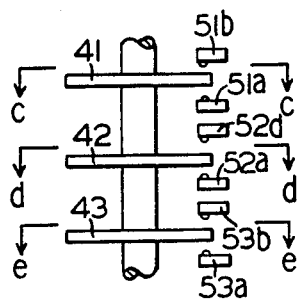
FIG. 4 is a side view of one example of the prior art.
Figure 5:
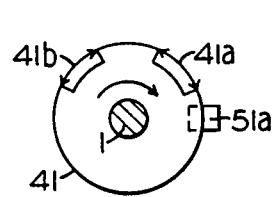
FIG. 5 is a cross-section along line c—c in FIG. 4.
Figure 6:
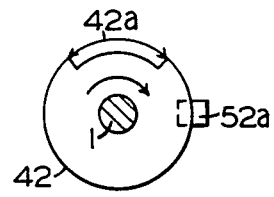
FIG. 6 is a cross-section along line d—d in FIG. 4.
Figure 7:
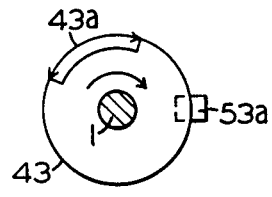
FIG. 7 is a cross-section along line e—e in FIG. 4.

In FIGS. 1–3, a light blocking plate 2 is rotatably fixed on the circumference of a rotating shaft 1 and this light blocking plate 2 lies in a plane essentially perpendicular to the axial centerline of the rotating shaft 1. In addition, there are optical transmitting areas 3, 4, 5 on the circumference R1, R2, R3, whose radii are different and whose center is on the axial centerline 0 of this light blocking plate 2. These optical transmitting areas 3, 4, 5 can be arcuate openings or transparent areas in the light blocking plate which can transmit light. There is a sensor unit 10 to sandwich this light blocking plate 2 from both sides in the axial direction, and as shown in FIG. 2, this sensor unit 10 is in the shape of an "]", in which identical upper and lower support plates 11 are fixed together in face-to-face relationship with one another and overlap. These support plates 11 are symmetrical about a specific center line, which is essentially perpendicular to and intersects the axial centerline 0, as shown in FIG. 1. As shown in FIG. 2, each support plate 11 has a rearwardly extending protrusion 12, on the right-hand side of the above-mentioned center line 0, and also has the same type of protrusion 13 in the center part. Protrusion 13 forms an arcuately recessed slot at the interface of the upper and lower support plates in which light blocking plate 2 is interposed.

In addition, one group of light emitting elements 14, 15 and 16 is mounted on the upper plate 11 on one side of the specific centerline thereof and another group of light emitting elements is mounted on the lower plate 11 on the other side of the specific centerline thereof. Each light emitting element 14, 15 and 16 of the respective upper and lower mounting plates is located, so as to overlay a respective one of the transmitting areas 3, 4, and 5 on circumferences R1, R2, and R3. Similarly, one group of light receiving elements 17, 18 and 19 is mounted on the lower plate 11 on the one side of the specific centerline thereof opposite the light emitting elements 14, 15 and 16 mounted on the upper plate 11. Another group of light receiving elements 17, 18 and 19 is mounted on the upper plate 11 on the other side of the specific centerline thereof opposite the light emitting elements 14, 15 and 16 mounted on the lower plate 11. These light emitting elements 14, 15 and 16 and light receiving elements 17, 18 and 19 of the respective upper and lower plates 11 are symmetrical about the specific centerline of plates 11.

Further, support plates 11 are formed with a central hollow portion at each face thereof adjacent the recessed slot formed by the protrusion 13. Housed in a chamber formed by the hollow portions of the respective support plates 11 are circuit boards 20, which provide a current limiting circuit 21, 22, and 23 for the light emitting elements and an amplifying circuit 24, 25, and 26 for the light receiving elements. A cover 30 of the respective upper and lower plates 11 encloses the printed circuit boards within this central chamber of support plates 11.

Conventional light emitting diodes may be employed for the light emitting elements 14, 15 and 16, and phototransistors may be employed for the light receiving elements 17, 18 and 19.

When the two symmetrical support plates 11 constructed in this manner face each other and overlap in a fixed manner, as shown in FIG. 3, the light emitting elements on the respective upper and lower support plates 11 face the light receiving elements of the respective opposite support plate. As light blocking plate 2 is rotated, a beam of light directed by the light emitting diodes toward a respective phototransistor is either sensed or interrupted, depending upon the pattern of the light transmitting areas 3, 4, and 5. Therefore, in the embodiment shown, six outputs can be obtained for a single light blocking plate 2. If the light transmitting area is located on a further circumference, such as at the rim of light blocking plate 2, and the number of light emitting diodes and phototransistors is increased accordingly, eight outputs can be obtained for a single light blocking plate 2. Even when the light transmitting areas are located on only two circumferences of light blocking plate 2, as many as four outputs can be obtained.

When used for a controller in which the pattern of the brake commands or the force command is different, the equipment can be controlled by using a light blocking plate in which the transmission area is different, while the sensor unit 10 described above can remain as is.

In the invention described with reference to the above embodiment, the transmission areas are located on several circumferences with different radii on a light blocking plate, and the sensor unit is one in which two identically-shaped support plates overlap, and these support plates are symmetrical to the specific centerline, and the light emitting element group on one support plate and the light receiving element group on the other support plate are arranged symmetrically, so that at least four outputs for one light blocking plate can be obtained. Therefore, the unit can have a small size, and at the same time, since the sensor unit is one in which two identically-shaped support plates overlap, standardization becomes possible, which reduces cost.

I claim:
1. A controller device comprising;
   (a) a light blocking plate having optical transmitting areas circumferentially arranged on several different radii thereof;
   (b) an operating shaft on which said light blocking plate is rotatably mounted, the center of said different radii coinciding with the centerline of said shaft;
   (c) a sensor unit having upper and lower support plates between which said light blocking plate is interposed, said upper and lower plates being symmetrical in shape on opposite sides of a specific centerline that is substantially perpendicular to said centerline of said shaft;
   (d) a first and second group of light emitting elements mounted on at least one of said upper and lower support plates on opposite sides of said specific centerline, the number of said light emitting elements in each said first and second group corresponding to the number of said different radii of said optical transmitting areas; and
   (e) a plurality of light receiving elements mounted on at least one of said upper and lower plates opposite respective ones of said light emitting elements and corresponding in number thereto to sense the presence and absence of a beam of light emitted by said light emitting elements.

2. A controller device as recited in claim 1, wherein said first group of said light emitting elements is mounted on said upper support plate and said second group of said light emitting elements is mounted on said lower support plate.

3. A controller device as recited in claim 1, wherein said light emitting elements of said first and second groups are radially disposed relative to said centerline of said shaft.

4. A controller device as recited in claim 3, wherein said light emitting elements of said first group lie in a straight line with said light emitting elements of said second group.

5. A controller device as recited in claim 1, wherein said light emitting elements are light emitting diodes and said light receiving elements are phototransistors.

6. A controller device is recited in claim 1, wherein said upper and lower support plates form a recessed slot at the interface therebetween to provide said interposition of at least a portion of said light blocking plate.

7. A controller device as recited in claim 6, wherein said upper and lower support plates form a hollow at the interface therebetween adjacent said recessed slot.

8. A controller device as recited in claim 7, wherein said hollow in said upper and lower support plates form a chamber in which is housed at least one printed circuit board having circuitry to effect operation of said light emitting elements and said light receiving elements.

9. A controller device as recited in claim 8, wherein said chamber is closed by a removable cover plate on said upper and lower support plates.

* * * * *